(12) United States Patent
Schwarz et al.

(10) Patent No.: US 8,154,517 B2
(45) Date of Patent: Apr. 10, 2012

(54) MULTIFUNCTION DISPLAY AND OPERATING DEVICE IN A MOTOR VEHICLE

(75) Inventors: Olaf Schwarz, Meine-Abbesbüttel (DE);
Rüdiger Woike, Braunschweig (DE);
Jörg Seifert, Halle (DE); Reiner Schmidt, Wettenberg (DE)

(73) Assignees: Volkswagen AG, Wolfsburg (DE);
Continental Automotive GmbH, Hannover (DE)

( * ) Notice: Subject to any disclaimer, the term of this patent is extended or adjusted under 35 U.S.C. 154(b) by 526 days.

(21) Appl. No.: 12/294,231

(22) PCT Filed: Feb. 5, 2007

(86) PCT No.: PCT/EP2007/000961
§ 371 (c)(1),
(2), (4) Date: Apr. 21, 2009

(87) PCT Pub. No.: WO2007/110121
PCT Pub. Date: Oct. 4, 2007

(65) Prior Publication Data
US 2009/0322684 A1    Dec. 31, 2009

(30) Foreign Application Priority Data

Mar. 23, 2006  (DE) .......................... 10 2006 013 859
Sep. 12, 2006  (DE) .......................... 10 2006 042 645

(51) Int. Cl.
G06F 3/02 (2006.01)
(52) U.S. Cl. ..................................................... 345/168
(58) Field of Classification Search .................. None
See application file for complete search history.

(56) References Cited

U.S. PATENT DOCUMENTS

| 4,376,879 A * | 3/1983 | Nagata et al. ............... 200/314 |
| 4,613,736 A | 9/1986 | Shichijo et al. |
| 6,411,877 B2 | 6/2002 | Bockmann et al. |
| 2004/0003986 A1 | 1/2004 | Ito et al. |
| 2005/0061645 A1 | 3/2005 | Ishibashi et al. |
| 2005/0061647 A1 | 3/2005 | Ichihara et al. |

FOREIGN PATENT DOCUMENTS

| DE | 32 10 044 | 9/1982 |
| DE | 102 05 796 | 10/2003 |
| DE | 103 30 275 | 1/2004 |
| JP | 2000 301932 | 10/2000 |
| JP | 2000 311554 | 11/2000 |
| JP | 2004 133655 | 4/2004 |
| WO | WO 00/21795 | 4/2000 |

OTHER PUBLICATIONS

International Search Report, PCT/EP2007/000961, dated May 22, 2007.
PCT International Written Opinion of the International Searching Authority, PCT International Application No. PCT/EP2007/000961, dated May 22, 2007. (not translated).

* cited by examiner

*Primary Examiner* — Paul Huber
(74) *Attorney, Agent, or Firm* — Kenyon & Kenyon LLP

(57) ABSTRACT

A multifunctional display and operating device in a motor vehicle includes a display field for displaying information, and, situated adjacent to the display field, includes operating elements for selecting functions, the operating elements arranged as keys which are each pivotable about a rotational axis extending in, or at an end region of the keys parallel to a surface of the display field.

12 Claims, 3 Drawing Sheets

MULTIFUNCTION DISPLAY AND OPERATING DEVICE IN A MOTOR VEHICLE

This application is a 371 of PCT/EP07/00961, filed Feb. 5, 2007.

FIELD OF THE INVENTION

The present invention relates to a multifunctional display and operating device in a motor vehicle, having a display field for displaying information, and, adjacent to the display field, operating elements are situated for selecting functions.

BACKGROUND INFORMATION

Multifunctional display and operating devices are used more and more these days in motor vehicles. On the one hand, they are used for displaying information on the state of the motor vehicle. On the other hand, these multifunctional display and operating devices are used to control vehicle systems, such as a navigational system or an automobile radio. A fixed function may be assigned to the individual operating elements. However, in certain conventional arrangements, multifunctional display and operating devices are preferred in which information is shown in the display field which indicate functional directions to the individual operating elements. This is done, for example, by showing the individual assigned functions on the display field, next to the operating elements. In other arrangements, the positioning of the functions on the display field correspond to the positioning of the operating elements of the multifunctional display and operating device. Such a multifunctional display and operating device is described, for example, in PCT International Published Patent Application No. WO 00/21795.

In certain conventional the multifunctional display and operating devices, the operating elements are designed as stroke keys. When operating these stroke keys, an up-and-down movement is executed perpendicular to the operating plane of the keys. In order to ensure a reliable and sure method of functioning of such stroke keys, it is necessary to provide relatively large gap dimensions between a stroke key and a panel or guiding device surrounding it. Operating elements that are arranged adjacently also have to maintain certain gap dimensions, so as to prevent that, when a key is operated, another key is operated along with it. However, in order to accommodate as large as possible a number of operating elements on a surface of a multifunctional display and operating device, it would be desirable to keep the gap clearances to as small as possible. If the distances between the gaps are selected to be too slight, when the up-and-down motions of the keys are executed, the keys may become skewed or jammed.

In order also to make possible operation in the dark, it is preferred that the operating elements be illuminated from the rear of the operating plane. When doing this, it is desirable to illuminate as large an area of the operating surface as possible. In order to attain a sure guidance of the keys, however, guideways are provided on the side of the key facing away from the operating surface which, in particular in the case of small keys, enclose a large part of the side facing away from the operating surface such that, in the case of stroke keys whose size is about 2 cm×1.2 cm, only a range of approximately 50% of the operating surface is able to be illuminated.

In particular in the case of stroke keys having a large planar extension or (and) a slight lift, in order to achieve a reliable switching response, it is mostly necessary to use several switching elements or a switching element that includes several switching devices that are spatially separated from one another (for example, switching domes arranged in switch mats). The reason is that otherwise, in response to an operating force that is not impinging centrally on the stroke key, skewing of the stroke key may take place and the reliable triggering of a switching process is not securely ensured in response to each operation. It is desirable to save on switching elements or switching devices without having to put up with a limitation in switching reliability.

SUMMARY

Example embodiments of the present invention provide a multifunctional display and operating device for which a better operability is achieved, in particular, that smaller gap clearances may be implemented and as large a proportion as possible of the operating surface is able to be illuminated.

In a multifunctional display and operating device of the type mentioned at the outset, in order to do this, it is provided that the operating elements are arranged as keys which are able to be pivoted in each case about a rotational axis extending in or at an end region of the keys parallel to the display surface. The arrangement of the operating elements as rotatable keys provides that the mechanical degrees of freedom of the operating element are reduced during operation as compared to an operating element arranged as a stroke key. This makes it possible to select a gap dimension to be smaller, for the same size of operating surface, as in the case of a stroke key of conventional arrangements. This makes it possible to position the operating elements in a manner of closer vicinity to one another. In addition, it will be more difficult for dust and dirt to enter into the hollow space between the key and a panel, or a key comb that surrounds the key. This lessens the soiling of the display and operating device, which could otherwise impair the functional suitability. The term rotational axis is used here in each case only for a virtual geometric axis, about which a rotational movement is executed or is able to be executed. The term rotational axis will not be used to designate an axis arranged in material. Because of the restriction of the degrees of freedom of the operating element, a reliable triggering of a switching process is able to be ensured using only one switching element at each operation. By contrast to stroke keys as in conventional arrangements, which include two switching elements or one switching element having two switching devices, an electronic circuit may thus be simplified and switching elements and/or switching devices may be dispensed with. Consequently, a more cost-effective and a simpler design of a multifunctional display and operating devices comes about, all things considered.

The keys may be supported pivotably in each case at individual axis elements. One obtains an arrangement that is particularly space-saving and that keeps the gap dimensions low, if at least two of the keys are supported in common at one axis element. In this manner, it is ensured in a simple manner that the two keys have a common rotational axis. As a rotational axis within the meaning discussed here, only the abstract axis is denoted, about which a rotation is executed. An axis element may be arranged as a cylindrical axis. It is also possible for the axis element only to include individual cylindrically developed sections. Additionally, the axis element may include sections that include only one cylinder sector. Such axis elements are sufficient, since the angle about which the keys are rotated amounts to only a few degrees, as a rule.

In order to provide as good an illumination as possible of an operating surface of the keys, it may be provided to create a hollow space under one-half of the keys on the inside of the multifunctional display and operating device. A switching element triggered by operating a key may therefore be positioned at a distance from the operating surface, below the key. Improved illumination of the operating surface of the key may thus be achieved for a key where the keys include a push rod, projecting from the side opposite the operating surface, whose one end interacts with a switching element of a switch mat when the operating element is operated, the push rod being arranged at an opposite end region of the key. If a connecting line between the end region and the opposite end region is designated as the longitudinal axis, then the operating surface is able to be illuminated in a large region along the longitudinal axis, which raises operability and operating convenience in the dark. Even the fact that the keys are pivotable at the one end region, about the rotational axis, already leads to being able to save a plurality of guides at the side of the key facing away from the operating surface. This enlarges the area of the operating surface that is able to be illuminated.

The operating convenience is, moreover, improved in an arrangement in which the keys each include a key cap made of a transparent base material which is lacquered at least at the operating surface, the lacquering being interrupted to form pictograms, symbols and/or characters. A representation of a fixed functional assignment to the operating elements may be made via the legend of the key caps. It is also possible in this manner only to make clear a preferred allocation. The enlarged region that is able to be illuminated in the case of the keys hereof, compared to the usual stroke keys, makes it possible to illuminate more or more complicated characters, symbols and/or pictograms, or larger characters and larger symbols or more complicated pictograms on the operating surface. This makes it possible to put whole words in a readable size on the operating surface, and not only to use abbreviations.

The push rod may be arranged integrally with a push rod element which is connected to the key cap, or latched to it, in order to fasten the key to the axis element. In this example embodiment, mounting the keys becomes a simple matter. The axis element is clamped between the push rod element and the key cap.

For the convenient operation of a multifunctional display and operating device, it is important that a user receive a haptic feedback when operating an operating element. For that reason, certain conventional operating elements include switching elements situated in switch mats. In certain conventional arrangements, these are arranged such that, when a so-called pressure point is passed, an opposing force of the switching element on the key decreases relatively abruptly, and simultaneously to this, a clicking noise is generated. Some users find this unpleasant. Example embodiments of the present invention therefore provide that, by using the switching element, which may be arranged as a switching dome, a force counteracting the operation acts on the key via the push rod when the key is operated, the force increasing at first with increasing excursion from an unoperated position of the key, reaching a local maximum at a haptic point and decreasing in response to a further increasing excursion until, at a stop point that represents an excursion at which a switching process of the switching element is triggered, a local minimum is reached.

It may be provided that the force transmitted via the push rod, at the haptic point amounts to 1-6 N, e.g., 2-3 N, for example, 2.5-2.8 N, e.g., 2.7 N, and at the stop point, the force acting via the push rod may amount to 0.5-2.5 N. At these suggested force values, for one thing, it is clearly imparted to the user, by the local force maximum at the haptic point, that he has successfully operated an operating element. At the same time, it is assured that the triggering of the switching element takes place at the stop point, using a minimum force. This ensures that a reliable switching process is triggered in each case. No disturbing noise is generated during the operation of the operating element. The following description of the figures is referred to for a specification of the measuring method.

The operating possibilities of an operating device are greatly increased by stating an allocation of the operating elements to the functions via the displayed information. This makes it possible, using characters or symbols or pictograms, to allocate different functions, independently of a legend on the keys.

A keying selection of the operating elements by a user, that is based purely on haptic impressions, is made possible in that the operating surface, at the opposite end region in an unoperated setting, as seen from the operating side, projects from a panel frame or a key comb. An excessive force action, which may lead to damage of the switching element, is able to be avoided exemplary embodiments, in which the operating surface at the opposite end region, in response to the excursion at which the switching process is triggered, closes level with a panel frame or key frame surrounding the key, or, as seen from the operating side, enters into the panel frame or key comb, and, in a non-excursion state, projects in an elevated state from the panel frame or the key comb. As soon as the key has traveled out to the stop point at which the switching element is operated, a finger of the user operating the key pushes at least partially against the panel or the key comb, in the case of a suitable dimensioning of the operating surface. Because of this, a part of the force is diverted to the panel or the key comb, so that an excessive force action is avoided. This particularly also applies if the operating elements are arranged in an area at which the user may unintentionally knock against the operating elements with some object. In such a case, in particular, it may be provided to cushion the enormously great forces using the panel frame or the key comb.

Example embodiments of the present invention are explained below in more detail with reference to the appended Figures.

DETAILED DESCRIPTION

Figure 1:
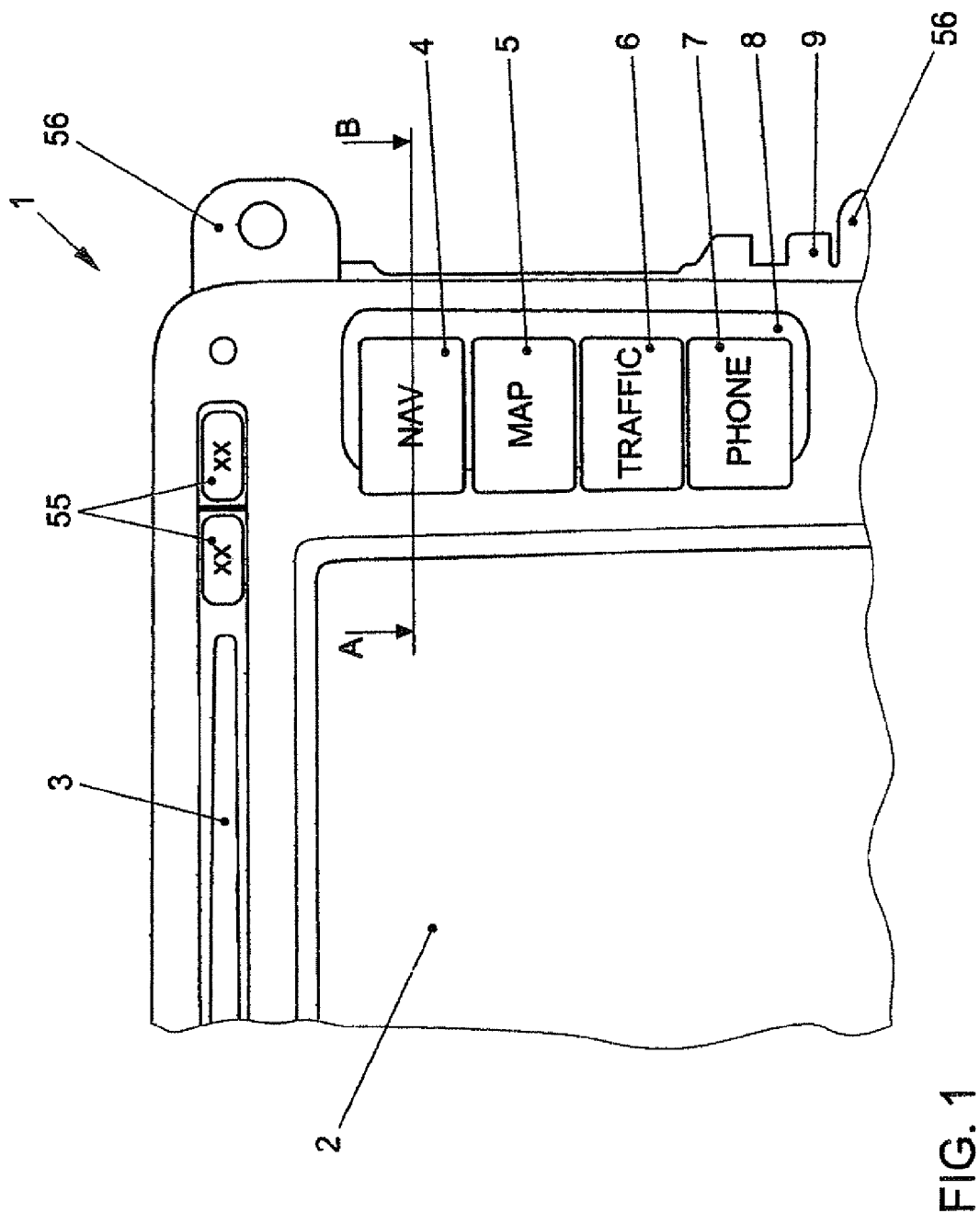
FIG. 1 is a partial top view onto a multifunctional display and operating device.

FIG. 1 is a partial top view of a multifunctional display and operating device 1. Multifunctional display and operating device 1 is arranged as a multimedia unit and navigational unit. It includes a display field 2, on which information is shown. In an upper area a slot 3 may be seen, in which storage media, especially optical storage media, such as CD's, DVD's, etc., are able to be introduced. Next to display field 2, operating elements 4-7 are situated. Operating elements 4-7 are arranged as keys that are rotatable about a rotational axis that runs parallel to the plane of the drawing. Operating elements 4-7 are surrounded by a key comb 8. The gap dimensions between operating elements 4-7 and key comb 8 may be selected to be smaller than in the case of an arrangement in which the operating elements are developed as stroke keys. Key comb 8 is fitted into a housing panel 9 of multifunctional display and operating device 1, e.g., using a snap-in connection. In order to achieve an easy recognizability of operating elements 4-7, key comb 8 has a surface character which absorbs/reflects light in the visible range at other wavelengths than the operating surfaces of operating elements 4-7. For example, the surface design of the operating surfaces may be held to black and that of the key comb may be held to white. Since the optical impression is similar to that of a piano, such keys are designated as piano keys.

Figure 2:
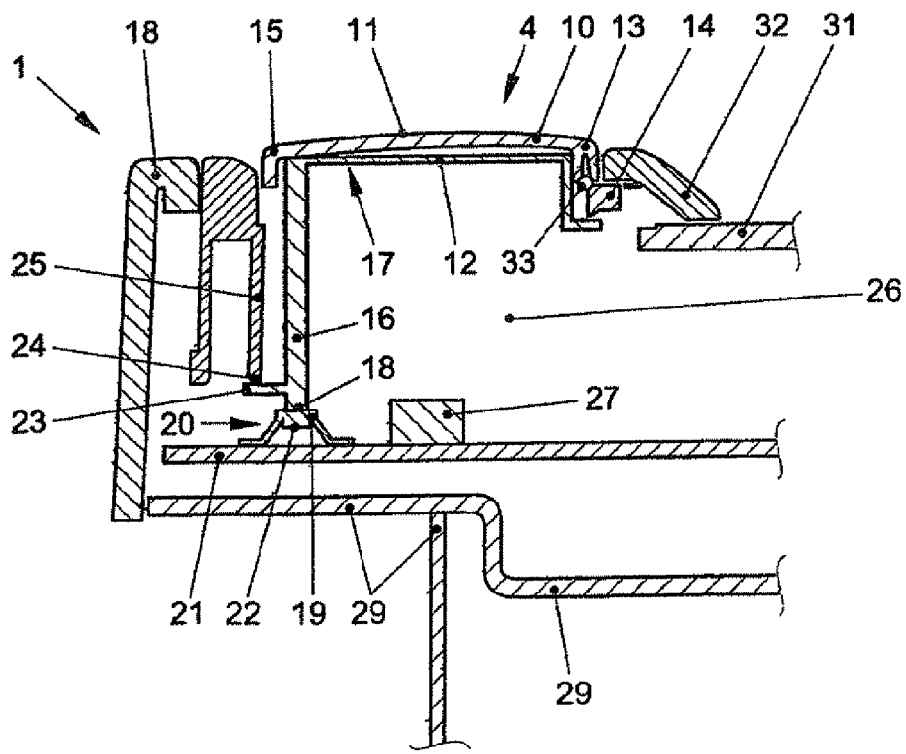
FIG. 2 is a schematic cross-sectional view through an operating element of the multifunctional display and operating device, as illustrated in FIG. 1, in an unoperated state.

FIG. 2 is a schematic cross-sectional representation along sectional line A-B through operating element 4 and a part of multifunctional display and operating device 1. The same technical features are marked with the same reference numerals. Operating element 4 is shown in an unoperated state. Operating element 4 includes a key cap 10, whose upper side is arranged as an operating surface 11. Key cap 10 is made of a transparent base material. Key cap 10 is lacquered on operating surface 11. At some places the lacquer has been removed after lacquering, using a laser, in order to write or draw letters or symbols into the lacquer. In operating element 4 as in FIG. 1, the letters "NAV" are applied onto operating surface 11, in this manner. In the area of the letters, the operating surface is thus transparent.

In addition to key cap 10, operating element 4 arranged as a key includes a push rod 12 that is rigidly connected to the key cap, e.g., using a latch or clip connection. Operating element 4 at its end region 13 is supported on an axis element 14, rotatably about a rotational axis which extends perpendicular to the plane of the drawing. Push rod element 12, at an opposite end region 15 of operating element 4, or the key, includes a push rod 16. Push rod 16 projects from a side 17 that is located opposite to operating surface 11. One end 18 of push rod 16 is located against a switching dome 19 of a switching element 20. Switching dome 19 may be a component of a switch mat. Switching element 20 includes switching dome 19 as well as circuit traces on a printed circuit board 21, which are contacted when there is a contact of a contact area 22 of switching dome 19 with the circuit traces on printed circuit board 21. Switching dome 19 includes an elastic material. In the unoperated state, this may be slightly stressed when end 18 of push rod 16 is located against it. Because of this, a projection 23 of push rod 16 is pressed against a lower end 24 of a leg 25 of key comb 8. This ensures that, in the unoperated state, the key is held at a specified excursion. Vibration or rattling of the keys in response to vibrations of a motor vehicle, into which the multifunctional display and operating device has been installed, is thus effectively prevented.

Push rod element 12, same as key cap 10, may be manufactured of a transparent base material. An illuminating device 27 is situated in a hollow space 26, between printed circuit board 21 and opposite side 17 of operating element 4. This may be fastened onto printed circuit board 21. Illuminating device 27 may be a light-emitting diode (LED) or a glow lamp or any other illuminating device. Light may also be conducted into hollow space 26, using a fiber. In addition to illuminating device 27, additional optical components may be provided, in order to improve the illumination of the operating surface or of the sections of operating surface 11 that has been freed from lacquer. Key comb 8 is fitted into a housing panel 9 and connected to it, e.g., using a snap-in connection. Housing panel 9 as well as printed circuit board 21 may be fastened to a housing 29 made of metal.

An edge 31 of display field 2, as well as a part of axis element 14, are covered using a cover panel 32. Axis element 14 includes a cylinder sector section 33. A pivot bearing developed in key cap 10 is in contact with this cylinder sector section 33 of axis element 14. All in all, axis element 14 is clamped between push rod element 12 and key cap 10. Axis element 14 may assume any desired designs, as long as the rotating motion of the key and operating element 4, about a rotational axis, extends parallel to a plane of display field 2. At least two adjacent operating elements may use the same axis element 14. Because of this, particularly small gap dimensions may be achieved between the operating elements. If the operating elements are arranged in the same manner as operating elements 4-7 as in FIG. 1, so that, in the end section 13, at or through which the rotational axis runs, they are arranged somewhat wider than in the remainder of the region, adjacent operating elements 4-7 have only small contact surfaces if they are situated directly side by side on a common axis element 14. The surfaces of operating elements 4-7 may be designed so that the static friction between adjacent operating elements 4-7 is not sufficient, when operating one of operating element 4-7, in order also to operate adjacent operating elements 4-7. Because of this, one is able to implement a very small gap dimension between the operating elements.

Figure 3:
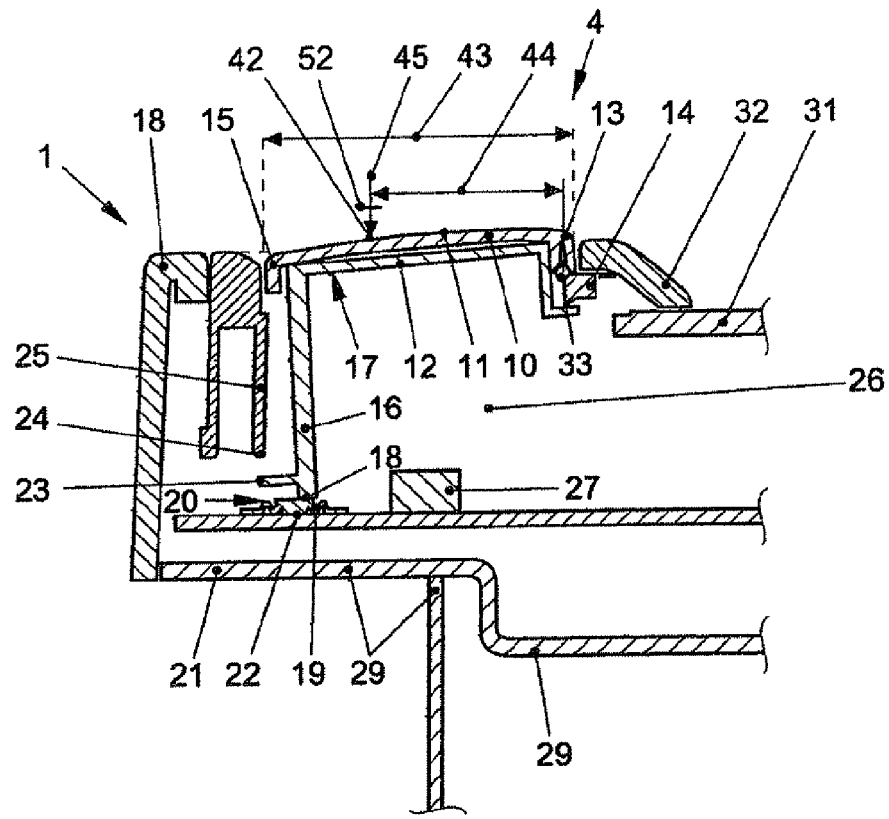
FIG. 3 is a schematic cross-sectional view through an operating element of the multifunctional display and operating device, as illustrated in FIGS. 1 and 2, in an operated state.

FIG. 3 is a schematic cross-sectional view through operating element 4 as in FIGS. 1 and 2, in an operated state. Switching dome 19 of switching element 20 is deformed such that contact surface 22 is in contact with the printed circuit traces of printed circuit board 21. The key or operating element 4 is designed so that operating surface 11 in the operated state, that is, when push rod 16 or switching dome 19 are at a stop point, terminates at the opposite end region 15 at key comb 8 or housing panel 9, or enters slightly into key comb 12 or housing panel 9. In the unoperated state, operating surface 11 projects at the opposite end region 15 with respect to key comb 8 or housing panel 9 (cf. FIG. 2).

Figure 4:
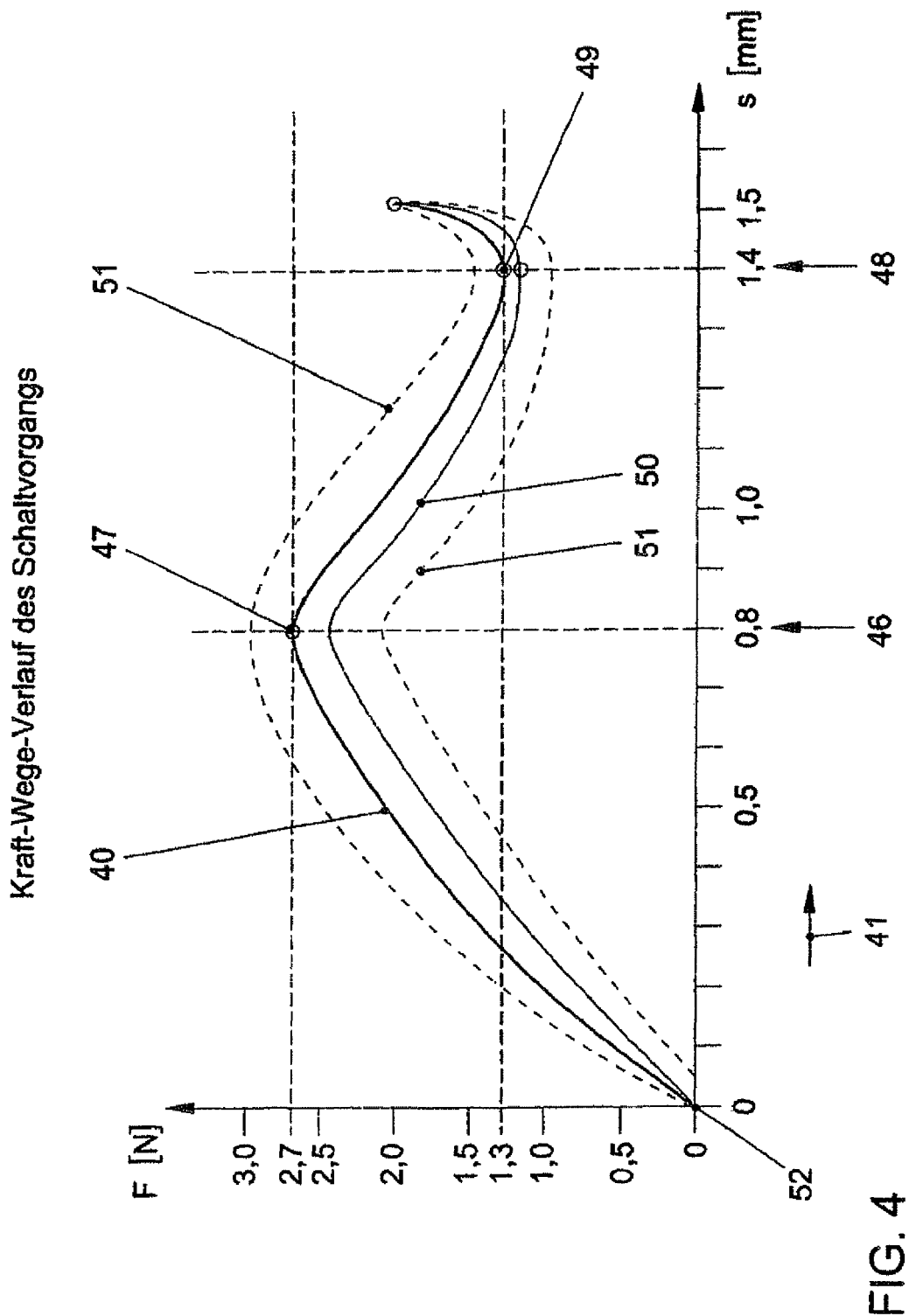
FIG. 4 is a graphic representation of a force transmitted by a switching element via a push rod onto an operating element of a switching element, plotted against the excursion of the operating element.

In FIG. 4, force 40 is plotted, as a function of an excursion 41 of operating element 4, which is exerted on it perpendicularly to printed circuit board 21, during the operation of operating element 4, by switching element 20 or switching dome 19 via push rod 16. The force is measured at a measuring point 42, which is drawn in schematically in FIG. 3. In the case of a key which, in its longitudinal direction 43 transversely to the rotational axis (cf. FIG. 3), extends about 21 mm, measuring point 42, measured in parallel to the printed circuit board or the display field, as indicated by a double arrow 44 in FIG. 3, is located at a distance of 13 mm from the rotational axis on operating surface 11. Excursion 41 of measuring point 42 is determined perpendicularly to the printed circuit board, as indicated by directional arrow 45 in FIG. 3 (in stating this, we assume an installation of the printed circuit board such that it is installed parallel to the surface of display field 2, which is planar or approximates a plane is assumed). Thus, in the unoperated state, a null point 52 (cf. FIG. 3), the excursion amounts to 0 mm. If operating element 4 is operated, force 40, which switching element 20 transmits via push rod 16 to the operating element, first increases steadily. At an excursion of 0.8 mm, which is designated as haptic point 46, force 40 reaches a local maximum 47. As the excursion increases, exerted force 40 decreases again until, at stop point 48 it reaches a local minimum 49. At this excursion, the switching process of switching element 10 is triggered. If the operating element is traveled out beyond stop point 48, force 40 rises very steeply (not completely, that is, it is only shown in a suggested manner). A force curve as shown may be implemented using a switching dome 19. However, switching element 20 may include a plurality of, for instance, switching devices each arranged as a switching dome. The values shown represent exemplary values. Lower curve 50 represents the force curve which acts on operating element 4 via push rod 16, in response to a backward motion in the non-operated setting. Dashed lines 51 indicate exemplary tolerance values of force 40. The values shown are example optimum values. The force at haptic point 46 should amount to between 1-6 N, e.g., between 2-3 N, for example between 2.5-2.8 N and, e.g., 2.7 N. The force at the stop point should amount to between 0.5-2.5 N and, e.g., 1.3 N. The absolute values for force and excursion given in FIG. 4 represent optimum values ascertained for a key having a longitudinal dimension transverse to the rotational axis of approximately 21 mm, which are measured at a distance (indicated by double arrow 44 in FIG. 3) of 13 mm from the rotational axis. The measured values are yielded in a static measurement. This means that the excursion is undertaken so slowly that dynamic effects, which could come about, for instance, in response to an abrupt snapping back of walls of the switching dome, are not taken into consideration.

Besides operating elements 4-7 that are arranged as piano keys, multifunctional display and operating device 1 is also able to include additional operating elements 55, arranged as stroke keys, which, for instance, control the ejection of storage media that are introduced into slot 3. Additional operating elements 55 are situated between slot 3 and one of a plurality of fastening lugs 56, which may be provided in one piece with a part of housing 29 (cf. FIG. 2) and define a plane parallel to display field 2.

LIST OF REFERENCE SYMBOLS 1 multifunctional display and operating device
2 display field
3 slot
4-7 operating elements
8 key comb
9 housing panel
10 key cap
11 operating surface
12 push rod element
13 end region of the key or operating element 4
14 axis element
15 opposite end region of the key or operating element 4
16 push rod
17 the side of the key or operating element 4 lying opposite the operating surface
18 end of the push rod
19 switching dome
20 switching element
21 printed circuit board
22 contact surface
23 projection
24 lower end of leg 25
25 leg
26 hollow space
27 illumination device
29 housing
31 edge of display field 2
32 cover panel
33 axis cylinder sector
40 force
41 excursion
42 measuring point
43 longitudinal direction
44 double arrow
45 directional arrow
46 haptic point
47 local maximum
48 stop point
49 local minimum
50 lower curve (force acting in response to backward motion)
51 lines (indicating tolerance values)
52 null point
55 further operating elements
56 fastening lugs

What is claimed is:

1. A multifunctional display and operating device in a motor vehicle, comprising:
    a display field adapted to display information; and
    operating elements adapted to select functions arranged adjacent to the display field;
    wherein the operating elements are arranged as keys which are each pivotable about a rotational axis extending one of (a) in and (b) at an end region of the keys parallel to a surface of the display field;
    wherein the keys include a push rod projecting from a side located opposite an operating surface, one end of the push rod adapted to interact with a switching element of a switch mat during operation of the operating element, the push rod arranged at an opposite end region of the key; and
    wherein the switching element is configured to exert a force, during operation of the key, counteracting operation on the key via the push rod, the force first increasing with increasing excursion from an unoperated setting, reaching a local maximum at a haptic point, and decreasing in response to a further increasing excursion, until a local minimum is reached at a stop point corresponding to an excursion at which a switching process of the switching element is triggered.

2. The multifunctional display and operating device according to claim 1, wherein each key is supported pivotably at individual axis elements.

3. The multifunctional display and operating device according to claim 1, wherein at least two of the keys are supported in common at one axis element.

4. The multifunctional display and operating device according to claim 1, wherein each key includes a key cap made of a transparent base material lacquered at least at an operating surface, the lacquer interrupted to form at least one of (a) symbols, (b) pictograms, and (c) characters.

5. The multifunctional display and operating device according to claim 1, wherein the push rod is formed integrally with a push rod element at least one of (a) connected and (b) latched to a key cap to fasten the key to an axis element.

6. The multifunctional display and operating device according to claim 1, wherein the switching element includes a switching dome.

7. The multifunctional display and operating device according to claim 1, wherein the force transmitted via the push rod, at the haptic point, amounts to between 1 and 6 N, and the force transmitted via the push rod amounts to between 0.5 and 2.5 N at the stop point.

8. The multifunctional display and operating device according to claim 1, wherein the force transmitted via the push rod, at the haptic point, amounts to between 2 and 3 N, and the force transmitted via the push rod amounts to between 0.5 and 2.5 N at the stop point.

9. The multifunctional display and operating device according to claim 1, wherein the force transmitted via the push rod, at the haptic point, amounts to between 2.5 and 2.8 N, and the force transmitted via the push rod amounts to between 0.5 and 2.5 N at the stop point.

10. The multifunctional display and operating device according to claim 1, wherein the force transmitted via the push rod, at the haptic point, amounts to 2.7 N, and the force transmitted via the push rod amounts to between 0.5 and 2.5 N at the stop point.

11. The multifunctional display and operating device according to claim 1, wherein the display field is adapted to display information including an allocation of the operating elements to the functions.

12. The multifunctional display and operating device according to claim 1, wherein an operating surface, at an opposite end region, in response to an excursion at which a switching process is triggered, at least one of (i) is flush with at least one of (a) a panel frame and (b) a key comb surrounding the key and (ii) as seen from an operating side, enters into at least one of (a) the panel frame and (b) the key comb and, in a non-excursion state, projects in an elevated state from at least one of (a) the panel frame and (b) the key comb.

* * * * *